US006395838B1

(12) United States Patent
Rodriguez-Parada

(10) Patent No.: US 6,395,838 B1
(45) Date of Patent: May 28, 2002

(54) PROCESS FOR MAKING GRAFT COPOLYMERS

(75) Inventor: José Rodriguez-Parada, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/760,941

(22) Filed: Jan. 16, 2001

Related U.S. Application Data
(60) Provisional application No. 60/176,881, filed on Jan. 19, 2000.

(51) Int. Cl.[7] ............................................. C08F 259/00
(52) U.S. Cl. ...................... 525/276; 525/293; 525/200; 526/247; 526/243; 526/248
(58) Field of Search ................................ 525/276, 293, 525/200; 526/247, 243, 248

(56) References Cited

U.S. PATENT DOCUMENTS

| | | | |
|---|---|---|---|
| 4,384,941 A | 5/1983 | Okamoto et al. | |
| 4,396,727 A | * 8/1983 | Ishigaki et al. | ............... 521/27 |
| 5,463,005 A | 10/1995 | Desmarteau | |
| 5,633,098 A | 5/1997 | Narang et al. | |
| 5,798,417 A | 8/1998 | Howard, Jr. | |

FOREIGN PATENT DOCUMENTS

| EP | 0850920 A2 | 1/1998 |
|---|---|---|
| WO | WO 98/20573 A1 | 5/1998 |
| WO | WO 98/31716 A1 | 7/1998 |
| WO | WO 99/45048 A1 | 9/1999 |
| WO | WO 99/52954 A1 | 10/1999 |

* cited by examiner

Primary Examiner—James J. Seidleck
Assistant Examiner—Olga Asinovsky

(57) ABSTRACT

The present invention is directed to a method for forming graft copolymers from perfluoroolefins and perfluorovinyl ethers having fluorosulfonyl and fluorosulfonate functionality with selected polymers, and the uncrosslinked graft copolymers resulting therefrom.

26 Claims, No Drawings

PROCESS FOR MAKING GRAFT COPOLYMERS

This Application claim benefit to provisional Application No. 60/176,881 Jan. 19, 2000.

FIELD OF THE INVENTION

The present invention is directed to a method for forming g,raft copolymers from perfluoroolefins and perfluorovinyl ethers having fluorosulfonyl and fluorosulfonate functionality with selected polymers, and the uncrosslinked graft copolymers resulting therefrom.

TECHNICAL BACKGROUND OF THE INVENTION

Howard. U.S. Pat. No. 5,798,417, discloses (perfluorovinyl ether)-grafted polyolefins. The grafting process involves contacting the polymer in the form of a powder or a shaped article with a free-radical initiator and the monomer. The reaction medium is heterogeneous and the polymer is invariably crosslinked during the grafting reaction. The degree of grafting varies with the initiator concentration and the reaction temperature. Up to 17 mol % incorporation of grafted monomer is claimed (up to 9 mol % shown in the examples). The polymers are useful as catalysts and as membranes in electrochemical cells.

U.S. Pat. No. 4,396,727 claims cation exchange membranes having fluorovinyl sulfonic acid monomers grafted onto high molecular weight substrates. Grafting is carried out directly on films by using ionizing radiation. Substrate polymers have the following repeat units: $CH_2$—$CXY$ where X is H, F. or $CH_3$, and Y is H or F. Polyethylene is the most preferred substrate. Solvents miscible with the monomer can be used to achieve thorough impregnation of the substrate. Graft ratios of up to 75% are reported (although graft ratio is not defined, it is commonly found in the grafting literature as $(w-w_0)/w_0$ where $w_0$ is the weight of the substrate and w is the weight after grafting. So 75% graft ratio is equivalent to 43 weight % grafting). The membranes are useful in electrochemical cells. U.S. Pat. No. 4,384,941 claims a process for electrolysis of pure water using these membranes.

Drysdale et al., WO 98/31716 discloses free radical grafting of partially fluorinated functionalized vinyl monomers to polyethylene. In the process, the polyethylene is first dissolved and the grafting reaction takes place in solution. Incorporation of up to ca. 13 mol-% is achieved. The polymers are useful as molding resins, for coatings and as catalysts.

DesMarteau, U.S. Pat. No. 5.463,005 discloses fluoromonomers containing sulfonimide groups and their copolymers with tretrafluoroetllylene. Conductive compositions of these materials are also disclosed.

Armand et al., EP 0,850,920 A2, teaches salts of perfluorinated amides and their use as materials for ionic conduction. Polymers containing sulfonimide side groups are disclosed. Examples include several condensation and addition polymers containing hydrocarbon backbones.

Narang et al., U.S. Pat. No. 5,633,098 disclose ionic polymers having sulfonic acid and sulfonimide functional groups. Polymers disclosed include polysiloxanes, polymethacrylates, and poly(alkene oxides).

Considerable interest has developed in the application of fluorinated ionomers as solid polymer electrolyte membranes in secondary lithium batteries and fuel cells. Key to these applications is the use of fluorosulfonates or derivatives thereof as cation exchange groups. It is believed that the cations associated with these functional groups only become sufficiently labile when highly electron-withdrawing fluorines are employed proximate to the sulfoilate and sulfonate derivatives, typically, in groups represented by the formula —$CF_2CF_2SO_3H$ or —$CF_2CF_2SO_3Li$ or sulfonyl imide or sulfonyl methide derivatives thereof. See for example Doyle et al., WO 9820573, Doyle et al., WO 9941292(A1), Feiring et al., WO 9945048(A1).

Polymer having a backbone of methylene groups and pendant groups having the formula —$CH_2CH_2$—$(CF_2)_2O(CF_2)_2SO_2F$ is prepared by a grafting reaction in Choi et al., WO 9952954.

The current state of the commercial art is exemplified by Nafion® Perfluoroionomer Membranes available from E. I. du Pont de Nemours and Company, Wilmington, Del. Nafion® membranes were developed for the highly corrosive environment of a chloralkali cell wherein the corrosion resistance of the perfluorinated ionomers is an important attribute. It is believed that in certain other applications such as lithium batteries corrosion resistance may be of less importance. In such a case considerable reduction in materials cost may be achieved by reducing the fluorine content in parts of the molecule which do not affect ionic conductivity. See for example Choi et al., WO 9952954.

The present invention provides a method for combining a perfluorinated functional group with a polymer having a backbone which contains carbon hydrogen bonds with the aim of providing a non-cross-linked, highly processible lower cost ionomer of high ionic conductivity.

SUMMARY OF THE INVENTION

The present invention provides for a process comprising:

contacting a first polymer having a backbone which comprises at least 50% methylene units with a solvent which swells or dissolves said first polymer to form a solvent-swollen polymer or polymer solution;

contacting said solvent swollen polymer or polymer solution with a source of free-radicals and a compound of the formula $F_2C=CFR^1R^2SO_2X$ wherein $R^1$ represents a covalent bond or a perfluoroalkenyl radical having 1 to 20 carbon atoms; $R^2$ is a radical of the formula:

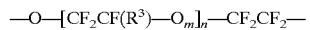

wherein m=0 or 1, n=0,1, or 2, and $R^3$ is F or a perfluoroalkyl radical having 1–10 carbons; and X is F or the radical represented by the formula

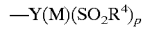

wherein Y is C or N, M is an alkali metal, $R^4$ is a perfluoroalkyl radical having 1–10 carbons optionally substituted with one or more ether oxygens, and p=1 or 2 with the proviso that p=1 when Y is N and p=2 when Y is C;

to form a reaction mixture;

providing sufficient heat to said reaction mixture to cause the initiation of free-radical reaction; and, reacting said mixture to form a graft copolymer.

The present invention further provides for a non-crosslinked polymer comprising a polymer having a backbone which comprises at least 50 mol-% methylene units and up to 50 mol-% of methylene units having a pendant group comprising a radical represented by the formula

wherein $R^1$ represents a covalent bond or a perfluoroalkenyl radical having 1 to 20 carbon atoms; $R^2$ is a radical of the formula:

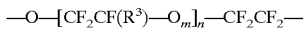

wherein m=0 or 1, n=0, 1, or 2, and $R^3$ is F or a perfluoroalkyl radical having 1–10 carbons, and X is F, —OM, or the radical represented by the formula

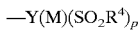

wherein Y is C or N, M is hydrogen or an alkali metal, $R^4$ is a perfluoroalkyl radical having 1–10 carbons optionally substituted by one or more ether oxygens, and p=1 or 2 with the proviso that p=1 when Y is N and p=2 when Y is C.

DETAILED DESCRIPTION

The present invention provides a process for preparing non-crosslinked graft copolymers by reacting a perfluoro vinyl compound comprising a sulfonyl fluoride functionality or derivative thereof with a polymer in the presence of a free radical initiator and a suitable solvent.

As used herein, the term "reacting" is intended to mean allowing at least two components in a reaction mixture to react to form at least one product. "Reacting" may optionally include stirring and/or heating or cooling.

In the process of the invention, the polymer is contacted with a solvent, which swells or, preferably, dissolves the polymer. The swollen polymer or polymer solution is further contacted with a perfluorovinyl compound comprising a sulfonyl fluoride functionality or derivative thereof and a source of free radicals. Preferably the perfluorovinyl compound is soluble in the solvent which swells or dissolves the polymer.

Polymers suitable for the process of the invention are those which have hydrogens along the backbone which can be abstracted by a free radical initiator. Suitable are polymers having at least 50 mol-% of methylene units in the polymer backbone. Most olefinic type polymers are suitable; suitable olefinic type polymers may be fluorinated but not perfluorinated. Preferred are polyethylene polypropylene, and their copolymers, as well as copolymers of ethylene with acrylates, methacrylates, and vinyl acetate terpolymers thereof with olefins having 3 or more carbons, and combinations thereof. Polyethylene is the most preferred.

Preferably, the source of free radicals is a free-radical initiator such as is well known in the art. Free radical initiators suitable for the process of the invention include inorganic peroxides and organic peroxides and azo compounds. Organic peroxides are preferred; tert-butyl peroxide and dicumyl peroxide are most preferred. The amount of initiator used is between 1 and 20 weight % of the polymer, preferably from 5 to 10 weight %.

Fluorinated vinyl compounds containing a fluorosulfonyl fluoride functional group or a derivative thereof are suitable for the practice of the invention. Suitable for the process of the invention are perfluorovinyl and perfluoroallyl ethers represented by the formula $F_2C=CRF^1R^2SO_2X$ wherein $R^1$ represents a covalent bond or a perfluoroalkenyl radical having 1 to 20 carbon atoms; $R^2$ is a radical of the formula:

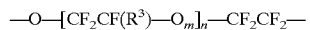

wherein m=0 or 1, n=0, 1, or 2, and $R^3$ is F or a perfluoroalkyl radical having 1–10 carbons; and X is F or the radical represented by the formula

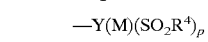

wherein Y is C or N, M is an alkali metal, $R^4$ is a perfluoroalkyl radical having 1–10 carbons optionally substituted with one or more ether oxygens, and p=1 or 2 with the proviso that p=1 when Y is N and p=2 when Y is C.

Preferably $R^1$ is a bond or —$CF_2$—, $R^3$ is a perfluoroalkyl radical having 1–4 carbons, m=1, n=0 or 1, and X is F. Most preferably $R^1$ is a bond, $R^3$ is —$CF_3$ and n=1.

The grafting reaction is carried out by contacting the perfluorovinyl compound, which is usually a liquid at the reaction temperature, with the polymer in the presence of the solvent. The polymer can be dissolved in a solvent or just swollen by the solvent. Higher incorporation of the monomers is achieved when the polymer is completely dissolved in the solvent. Suitable solvents include aromatic hydrocarbons such as chlorobenzene and dichlorobenzene, halogenated hydrocarbons, and polar aprotic solvents such as dimethyl acetamide and dimethyl formamide. Chlorobenzene is preferred.

In the preferred embodiment of the invention the grafting reaction is carried out by first dissolving or swelling the polyethylene in chlorobenzene at the reaction temperature, adding a fluorinated vinyl compound, preferably perfluoro (3,6-dioxa-4-methyl-7-octenesulfonyl fluoride) (PSEPVE) and free-radical initiator, and stirring the mixture under an inert atmosphere. The concentration of chlorobenzene can range from about 30% by weight in the swollen polymer to about 99% in a polymer solutions. Most preferred are solutions having polyethylene concentrations of 3 to 6% by weight. Reaction temperatures can be typically between room temperature and about 160° C. depending on the solubility of the polymer and the decomposition temperature of the initiator. The most preferred range is between 80 and 130° C. An inert atmosphere is necessary to avoid reaction of the free radicals with oxygen. Nitrogen and argon are suitable atmospheres.

According to the present invention, grafting occurs at the methylene units along the polymer backbone. However, steric considerations prevent grafting on nearby methylene units. Thus, in the preferred embodiment wherein the backbone consists entirely of methylene units, a maximum degree of grafting is achieved with slightly more than 20% of methylene units being subject to grafting. It is found in the practice of the invention that the graft polymers obtained in the preferred embodiment of the process of the invention contain from 10 to 87 weight percent of the radical derived from the PSEPVE. The degree of grafting depends on the temperature and on the concentration of polymer, fluorinated vinyl compound, and initiator, as shown in the examples below.

The graft polymers of the present invention not being crosslinked exhibit excellent processibility. The non-ionic sulfonyl fluoride forms are melt processible by conventional means such as extrusion or molding, and are soluble in fluorinated solvents, aromatic hydrocarbons such as chlorobenzene, dichlorobenzene, toluene, and xylene, and halogenated hydrocarbons such as tetrachloroethane. The ionic forms, such as the imides, methides, sulfonates, and sulfonic acids, of highly grafted low MW polymers are soluble in water and methanol. This is in contrast to the graft polymers of Howard, op.cit., which are crosslinked and therefore insoluble.

The polymer produced by the process of the present invention is also more uniformly grafted than in Howard. In the process of Howard, grafting occurs predominantly at surfaces of particles and shaped articles. In the most preferred embodiment of the present invention, wherein the reaction is performed in solution, mixing of the reactants takes place on the molecular scale, affording a considerable improvement in homogeneity.

In another embodiment, the process of the invention may be conducted by swelling porous particles of polymer in a mixture of solvent and fluorinated vinyl compound also containing free-radical initiator, and heating them below the melting point of the polymer. As in the preferred embodiment hereinabove described, the degree of grafting depends on the ratio of fluorinated vinyl compound to solvent as shown in the examples below. Suitable fluorinated vinyl compounds, solvents, and initiators are the same as hereinabove described above for the preferred embodiment. In the present embodiment, reaction temperatures should be kept below the lower of polymer melting point or dissolution temperature of the polymer in the reaction mixture.

The graft copolymers of the present invention can be processed into films by known melt-processing methods as well as by solution casting methods. Tough transparent films are obtained by both methods.

The successful practice of the process of the invention depends upon the dispersibility of the fluorinated vinyl compound within the solvent-swollen or dissolved polymer. It is found in the practice of the invention that the best results are obtained when the fluorinated vinyl compound is itself soluble in the solvent. When the fluorinated vinyl compound is not soluble in the solvent, obtaining a homogeneous dispersion of the fluorinated vinyl compound in the polymer is much more problematical. For this reason, it is preferred to perform the grafting reaction with the fluorinated vinyl compound in the form of a sulfonyl fluoride, followed by hydrolysis to the sulfonate form or imidization or methidization to the respective imide or methide form, as shown in the specific embodiments provided. The sulfonate form can further be converted to the sulfonic acid by acid exchange.

In a preferred embodiment, polyethylene is dissolved as described hereinabove, and the resulting solution combined under the above conditions with a free radical initiator and a fluorinated vinyl compound represented by the formula $F_2C=CFR^1R^2SO_2X$ wherein $R^1$ is a perfluoroalkyl radical or a covalent bond, $R^2$ is a radical of the formula:

—O—[CF$_2$CF(R$^3$)—O$_m$]$_n$—CF$_2$CF$_2$— wherein m=0 or 1, n=0, 1 or 2, and $R^3$ is F or a perfluoroalkyl radical having 1–10 carbons; and X is F. More preferably $R^1$ is a perfluoroalkyl radical having 1–4 carbons or a covalent bond, m=1, n=0 or 1, and $R^3$ is a perfluoroalkyl radical having 1–4 carbons. Most preferably $R^1$ is a covalent bond, and $R^3$ is —CF$_3$. The product so formed is the related graft copolymers in sulfonyl fluoride form.

The sulfonyl fluoride polymer obtained according to the preferred process of the invention can be transformed into ionomers by hydrolysis procedures which are known in the art; see for example Doyle et al., WO 9941292(A1). For example, the sulfonyl fluoride groups can be transformed to sulfonates by reacting with alkali metal hydroxide solutions such as LiOH in water, water/methanol, and water/DMSO. Hydrolysis temperature ranges from room temperature to about 90° C.

While it is within the scope of the process of the invention to combine an unsaturated disulfonyl imide or methide perfluorovinyl ether, such as described in Feiring et al., WO 9945048(A1) with the polymer, and perform the grafting reaction as hereinabove described, the limited solubility of the imide in ordinary solvents provides an incentive to perform the imidization, or methidization step, after the graft copolymer is formed in the sulfonyl fluoride form.

In a preferred embodiment, in a second step, a perfluorosulfonamide is reacted with the sulfonyl fluoride form of the graft copolymer in the presence of a base. Isolation of the polymer is not necessary, and is less preferred, and the second step can be performed immediately after grafting. High conversions are achieved. Triethylamine is the preferred base but other bases soluble in the reaction media can be used.

In a more preferred embodiment, triethylamine is used as the base in the second step of the reaction. Surprisingly, the imidized polymer so formed, obtained as the triethylammonium imide salt, is soluble and tractable, allowing films to be prepared either by casting from solution or by melt processing. Transformation to the lithium salt is easily achieved by reacting with lithium hydroxide solutions. Reactive solutions include LiOH in water, water/methanol, and water/DMSO. Hydrolysis temperature ranges from room temperature to about 90° C. The polymer is less soluble in the lithiated form.

In a further embodiment of the process of the invention the polymer can be isolated after the grafting reaction, and the second step carried out as described above on the purified polymer. The results are the same. By this method other solvents and bases, that are not compatible with the grafting reaction, can be used.

The non-ionic sulfonyl fluoride form of the graft polymers obtained by the process of the invention are not crosslinked and therefore soluble in numerous organic solvents including aromatic hydrocarbons such as chlorobenzene, dichlorobenzene, toluene, and xylene, and halogenated hydrocarbons such as tetrachloroethane. The ionic form of the graft polymers obtained by the process of the invention are largely insoluble in most organic solvents, but are of limited solubility in water and alcohols. However, it is observed in the practice of the invention that when the triethylammonium imide is formed according to the process of the invention, the product stays in the reaction mixture. It is not known whether the mixture is a true solution or a fine dispersion.

Any method known in the art for converting a small molecule having sulfonyl fluoride functionality to imide or methide has been found to be suitable for the practice of the process of the present invention for converting the sulfonyl fluoride form of the graft copolymers of the present invention. Various methods are described in Des Marteau et al., *Inorg. Chem.*, 1984, 23, 3720, Des Marteau et al., *Inorg. Chem.*, 1990, 29, 2982, Canadian patent 2000142-A; U.S. Pat. No. 4,505,997; and U.S. Pat. No. 5,072,040. Preferably, the sulfonyl fluoride is contacted with a perfluorosulfonamide, preferably perfluoromethylsulfonylamide, in the presence of triethylamine. A description of the preferred method is found in Hamrock et al., WO 99/49529.

In a further embodiment, it is found that uncrosslinked sulfonyl fluoride graft copolymers prepared according to the method of Drysdale et al., op cit., are also converted at high yield according to the same imidization procedures found to be effective for the sulfonyl fluoride form of the graft copolymers of the present invention. In a preferred embodiment, a polymer having methylene monomer units and a pendant group having the formula

—CH$_2$—CH$_2$—CR$^5$R$^6$R$^7$X wherein $R^5$ and $R^6$ are each independently fluorine or perfluoroalkyl, $R^7$ is fluorinated alkylene optionally containing ether oxygen and X is —$SO_2F$, is contacted with perfluorosulfonamide, preferably perfluoromethylsulfonylamide, in the presence of triethylamine to form the associated imide which may then be readily ion exchanged to form the lithium ionomer useful in batteries.

When forming the ionic species of the invention, namely the sulfonates, sulfonic acids, imides and methides as herein described, the methods employed in the art for small molecules rather than polymers may be employed. However, solubility considerations make the reactions more problematical. The solvents typically used for these reactions with small molecules are polar aprotic solvents such as acetonitrile, THF, diethyl ether, DMSO. Most of these do not appreciably dissolve the sulfonyl fluoride form of the graft copolymers of the invention, and therefore are less preferred. Preferred instead are chlorobenzene, dichlorobenzene and toluene.

Stability is a further concern in the particular case wherein the polymer backbone comprises monomer units of vinylidene fluoride. Polyvinylidene fluoride is known to be unstable to bases, the methods of the art for forming imides when applied to a graft copolymer of polyvinylidene fluoride result in degradation of the backbone chain.

Once conversion to the imide or methide form is accomplished e.g., to form the triethylammonium imide or methide, the lithium imide or methide may be formed according to ordinary ion exchange means as is well known and widely practiced in the art, and as hereinabove described.

Ionomers prepared by this process are useful for electrochemical applications such as batteries, fuel cells, electrolysis cells, ion exchange membranes, sensors, or electrodes.

EXAMPLES

Example 1

Grafting of PSEPVE onto Polyethylene in Solution

A 500 mL 3-neck round bottom flask, provided with condenser, gas inlet, thermocouple, addition funnel, and magnetic stirring was charged under $N_2$ atmosphere with the following: 10 grams of polyethylene (Novapol® low density polyethylene from NOVA Chemicals of Calgary, AB, Canada), 300 mL of chliorobenzene (Aldrich), and 20 grams of PSEPVE made according to Connolly et al., U.S. Pat. No. 3,282,875. The flask was placed in an oil bath at 90° C. and the mixture was stirred until all of the polyethylene dissolved. Then, a solution of 1 g benzoyl peroxide in 20 mL of chlorobenzene was added drop-wise through the addition funnel during a one hour period. The reaction mixture was stirred continuously at 90° C. for a total of 6 hours.

After the reaction time, the mixture was diluted with 80 mL of chlorobenzene and precipitated into methanol. The polymer obtained was filtered through a glass fritted funnel and washed with methanol. It was further extracted in a soxhlet apparatus with acetone for a total of 10 hours. Finally, it was dried overnight under vacuum at 50° C. 13.6 g of polymer were obtained, with 26.7 weight-% incorporation of PSEPVE as determined by $^1H$ NMR and elemental analysis.

The procedures of Example 1 were repeated in Examples 2–15 with some variation in the quantities of materials, temperature, initiator, solvent and time as indicated in Table 1. Results are summarized in Table 1. Examples 10, 11, 12, 13 all came from the same reaction. They were taken out of the reaction mixture at different times to follow conversion.

TABLE 1

Preparation of PSEPVE- grafted polyethylene

| Example No. | Polymer (g) | PSEPVE (g) | Chlorobenzene (mL) | t-Butyl Peroxide (g) | Time (h) | Temperature (° C.) | Yield (g) | PSEPVE incorporation (weight %) |
|---|---|---|---|---|---|---|---|---|
| 1 | 10 | 20 | 300 | 1** | 6 | 90 | 13.6 | 26.7 |
| 2 | 10 | 11 | 120* | 1 | 24 | 120 | 16.4 | 39.0 |
| 3 | 10 | 15 | 120* | 1 | 8 | 120 | 17.9 | 44.2 |
| 4 | 10 | 15 | 320* | 2 | 8 | 120 | 19.1 | 47.7 |
| 5 | 10 | 15 | 320* | 2 | 8 | 120 | 19.9 | 49.7 |
| 6 | 10 | 15 | 320 | 2 | 6 | 120 | 20.2 | 50.4 |
| 7 | 10 | 20 | 200* | 1 | 24 | 120 | 20.9 | 52.1 |
| 8 | 10 | 20 | 300 | 2 | 8 | 120 | 26.8 | 62.7 |
| 9 | 10 | 20 | 300* | 2 | 24 | 120 | 30.0 | 66.6 |
| 10 | 10 | 50 | 300 | 2 | 3 | 126 | NA | 68.0 |
| 11 | 10 | 50 | 300 | 2 | 4 | 126 | NA | 72.0 |
| 12 | 10 | 50 | 300 | 2 | 6 | 126 | NA | 74.8 |
| 13 | 10 | 50 | 300 | 2 | 9 | 126 | NA | 76.6 |
| 14 | 10 | 50 | 300 | 2 | 20 | 125 | 43.8 | 77.3 |
| 15 | 5 | 50 | 150 | 2 | 6 | 126 | 38.1 | 86.9 |

*o-dichlorobenzene
**Benzoyl peroxide

Films of the graft polymers were prepared from the melt in a Pasadena Hydraulics model SP 215C press at 140° C. and 30,000 lbs. Films with thickness between 5 and 10 mils were prepared. The films were hydrolyzed to the lithium form by immersing them in a 1M LiOH solution in Water/DMSO (1/1 by volume) at 80° C. for several hours. After rinsing with DI water, they were dried in a vacuum oven at 90–100° C. for 48 to 72 hours. FTIR indicated complete hydrolysis of the films.

Ionic conductivity was measured on these films swollen with propylene carbonate (PC), and a 1:1 mixture of ethylene carbonate (EC) and dimethyl carbonate (DMC). The dried hydrolyzed films were soaked in excess solvent for several hours and allowed to attain maximum swelling (typically 5 hours for most samples). The films were then removed from the liquid, blotted with a paper towel to remove excess solvent, and tested. Conductivity was determined using the four-point probe technique described in Doyle et al., WO 9820573(A1), which is incorporated herein by reference.

TABLE 2

Ionic conductivity of PSEPVE- grafted polyethylene

| Example No. | Weight % PSBPVE | mol % Repeat Units grafted | PC Conduct. (S/cm) | EC/DMC Conduct. (S/cm) |
| --- | --- | --- | --- | --- |
| 1 | 26.7 | 2.3 | 1.50E-05 | 2.34B-05 |
| 2 | 39.0 | 4.0 | 9.67E-05 | 6.44E-05 |
| 3 | 44.2 | 5.0 | 2.18E-04 | 2.07E-04 |
| 4 | 47.7 | 5.7 | 2.89E-04 | 2.41E-04 |
| 5 | 49.7 | 6.2 | 2.53E-04 | 2.56E-04 |
| 6 | 50.4 | 6.4 | 2.79E-04 | 2.08E-04 |
| 7 | 52.1 | 6.8 | 2.87E-04 | 2.85E-04 |
| 8 | 62.7 | 10.5 | 4.28E-04 | |
| 9 | 66.6 | 12.4 | | 6.60E-04 |
| 10 | 68.0 | 13.3 | 2.48E-04 | |
| 11 | 72.0 | 16.0 | 4.17E-04 | |
| 12 | 74.8 | 18.5 | 3.20E-04 | |
| 13 | 76.6 | 20.5 | 4.21E-04 | |
| 14 | 77.3 | 21.0 | 4.56E-04 | |

Examples 16–19

Grafting of PSEPVE onto Polyethylene in a Swollen State

Four 50 mL Schlenk tubes were each charged with the following: 5 g of porous polyethylene granules (Spherilene® linear low density polyethylene from Montell USA Inc. of Wilmington, Del.), 0.5 g of t-butyl peroxide (Aldrich), and 5 mL of PSEPVE. In addition three of the tubes were charged with 3, 5, and 10 mL quantities of chlorobenzene. The tubes were evacuated and purged with nitrogen four times and then heated to 120° C. for 8 hours under nitrogen atmosphere. After cooling to room temperature the polymer granules were filtered off and placed in soxhlet extractors where they were extracted with acetone for 8 hours to remove any traces of monomer or solvent. Finally the samples were dried in a vacuum oven at 60° C. for 48 hours.

Under these reaction conditions the polymer granules did not dissolve in the reaction mixture but were swollen to different extents. The amount of grafted monomer increased dramatically by using a small amount of solvent. The results are shown in Table 3.

TABLE 3

Grafting of PSEPVE onto polyethylene in the solid state

| Example No. | PSEPVE/ Chlorobenzene mL/mL | PSEPVE incorporation weight % | mol % Repeat Units grafted | Polymer Tm °C. |
| --- | --- | --- | --- | --- |
| 16 | 5/0 | 23.3 | 1.9 | 126 |
| 17 | 5/3 | 51.1 | 6.5 | 117 |
| 18 | 5/5 | 51.6 | 6.7 | 116 |
| 19 | 5/10 | 54.9 | 7.6 | 113 |

Example 20

A 600 mL stainless steel Parr pressure reactor (from Parr Instrument Co, Moline, Ill.) was charged with 10 g of polyethylene (Novapol® low density polyethylene from NOVA Chemicals of Calgary, AB, Canada), 200 mL of o-dichlorobenzene (Aldrich), and 15 g of perfluoro(3-oxa-4-pentenc sulfonyl fluoride) prepared according to the method described in Ezzell et al., U.S. Pat. No. 4,358,545. The reactor was purged and vented three times with nitrogen (100 psig) and then heated to 120° C. for 1 hour under autogenous pressure ~15 psig) to dissolve the polyethylene. Then a solution containing 2 g of t-butyl peroxide in 50 mL of o-dichlorobenzene was pumped into the reactor at 0.5 mL/min. The reaction mixture was stirred at 500 rpm and 120° C. for a total of 8 hours. Finally the reactor was allowed to cool down and remain overnight at room temperature without stirring.

After discharging the reactor, the reaction mixture was first heated to redissolve the polymer and then it was precipitated into methanol. The precipitated material was filtered off and extracted in a soxhlet extractor with acetone for 6 hours. Then it was dried in a vacuum oven at 50° C. for 48 hrs.

The polymer obtained was further purified by dissolving it in toluene and precipitating into methanol. After filtering it and drying 17.7 g of graft polymer were obtained. The polymer contained 9 mol % of grafted perfluorosulfonyl fluoride monomer as determined by $^1$H NMR and elemental analysis. It had average molecular weights Mn=18,600 and Mw=75,300 as determined by Size Exclusion Chromatography in trichlorobenzene at 135° C. DSC analysis of the polymer showed a glass transition temperature at −22° C., and a melting transition at 99° C. with a heat of fusion of 28 J/g.

A film of this material was prepared and hydrolyzed as described above in Example 1. In PC it swelled 251% and had a conductivity of 3.21E-04 S/cm while in a 1:1 mixture of EC/DMC it swelled 184% and had a conductivity of 4.12E-04 S/cm.

Examples 21–24

Grafting of PSEPVE onto Copolymers of Ethylene and Methacrylic Acid

A 500 mL 3-neck round bottom flask fitted with condenser, gas inlet, thermocouple, addition funnel, and magnetic stirring was charged under $N_2$ atmosphere with 10 grams of an ethylene copolymer with Methacrylic acid (Nucrel® 0407 from E. I. du Pont de Nemours and Company of Wilmington, Del.), and 250 mL of chlorobenzene (Aldrich). The flask was placed in an oil bath at 120° C. and the mixture stirred until the polymer dissolved. After adding 20 g of PSEPVE to the reaction mixture, a solution of 2 g of t-butyl peroxide in 50 ml, of chlorobenzene was added drop-wise through the addition funnel during a 45 min period. The reaction mixture was continued to stir at 120° C. for a total of 8 hours.

After the set reaction time, the mixture was poured into a large excess of methanol. The precipitated polymer was filtered off. washed with methanol, and dried in a vacuum oven at 70° C. for 24 hours. 23.3 g of polymer were obtained.

This reaction was repeated under the same conditions using other grades of Nucrel® resins containing different amounts of methacrylic acid. The grafting of fluoromonomer decreased with increased content of methacrylic acid in the copolymer. Results of these reactions are shown in Table 4.

TABLE 4

Grafting of PSEPVE onto copolymers of ethylene and methacrylic acid

| Example No. | Methacrylic Acid in Copolymer (weight %) | Yield of grafting reaction (g) | PSEPVE grafted weight % |
|---|---|---|---|
| 21 | 4.0 | 23.3 | 57 |
| 22 | 8.7 | 22.2 | 55 |
| 23 | 8.7 | 20.8 | 52 |
| 24 | 20.0 | 14.6 | 32 |

Films of these polymers were prepared and hydrolyzed as described above in Example 1. A film of sample E93888-46 swelled 126% in PC and had an ionic conductivity of 3E-04 S/cm.

Examples 25–30

Grafting of PSEPVE onto Block Copolymers of Styrene and Ethylene/butylene

A 500 mL 3-neck round bottom flask fitted with condenser, gas inlet, thermocouple, addition funnel, and magnetic stirring was charged under $N_2$ atmosphere with 10 grams of copolymer (Kraton® D1101 from Shell Oil Co. of Houston, Tex.) and 300 mL of chlorobenzene (Aldrich). The flask was placed in an oil bath at 120° C. and the mixture stirred until the polymer dissolved. After adding 20 mL of PSEPVE to the reaction mixture, a solution of 2 g of t-butyl peroxide in 20 mL of chlorobenzene was added drop-wise through the addition funnel during a 1 hour period. The reaction mixture was stirred at 120° C. for a total of 8 hours.

After the reaction time, the mixture was poured into a large excess of methanol. The precipitated polymer was filtered off, washed with methanol, and dried in a vacuum oven at 50° C. for 24 hours. It was further purified by dissolving it in chloroform and precipitating into methanol. After filtering and drying 23.5 g of polymer were obtained.

This reaction was repeated under the same conditions using other grades of Kraton® resins containing different styrene/rubber (S/R) ratios. Results of these reactions are shown in Table 5.

TABLE 5

Grafting of PSEPVE onto block copolymers of styrene and ethylene/butylene

| Example No. | Polymer S/R ratio | PSEPVE added (mL) | Grafting yield (g) | PSEPVE grafted (weight %) | % Swell in Water | Conductivity (S/cm) In Water |
|---|---|---|---|---|---|---|
| 25 | 13/87 | 10 | 15.5 | 35.5 | 171 | 5.63E-03 |
| 26 | 13/87 | 15 | 16.9 | 40.7 | 356 | 3.07E-03 |
| 27 | 29/71 | 15 | 21.7 | 53.8 | 360 | 2.88E-03 |
| 28 | 29/71 | 20 | 23.5 | 57.4 | NA | NA |
| 29 | 33/67 | 15 | 19.6 | 48.9 | 318 | 3.82E-03 |
| 30 | 33/67 | 20 | 22.5 | 55.6 | NA | NA |

Films of the graft block copolymers were prepared from the melt in a Pasadena Hydraulics model SP 215C press at 130° C. and 30,000 lbs. Films with thickness between 5 and 10 mils were made. The films were hydrolyzed to the lithium form by immersing them in a 1M LiOH solution in water/methanol (1/1 by volume) at 75° C. for two hours. After rinsing with DI water, they were dried in vacuum oven at 90–100° C. for 48 to 72 hours. Ionic conductivity of these films was measured as described above in Example 1. Conductivity in water is shown in Table 5 and is in the order of $10^{-3}$ S/cm for all samples.

Examples 31

Synthesis of PSEPVE-imide Grafted Polyethylene

A 500 mL 3-neck round bottom flask, equipped with a condenser, magnetic stirring, addition funnel, gas inlet, and under nitrogen atmosphere was charged with 8.0 grams of polyethylene (Novapol® low density polyethylene from NOVA Chemicals of Calgary, AB, Canada) and 100 mL of chlorobenzene (Aldrich). The flask was placed in an oil bath at 125° C. and the mixture stirred until the polyethylene dissolved. After adding 15 g of PSEPVE to the reaction mixture, a solution of 0.5 g of t-butyl peroxide (Aldrich) in 25 mL of chlorobenzene was added drop-wise through the addition funnel over 30 minutes. The mixture was stirred at 125° C. for a period of 6 hours. After this time, the temperature was lowered to 70° C. and 10 mL of triethylamine were added. Then 5.0 grams of trifluoromethanesulfonamide (TCI America, Portland, Oreg.) were added in small portions using a powder addition funnel and the mixture was stirred for 24 hours at 70–80° C.

After the reaction time the mixture was poured into a large excess of methanol and the precipitated polymer was filtered, washed and dried in a vacuum oven at 60° C. for 48 hrs. 18.5 g of graft polymer were obtained. $^1$H NMR of this polymer indicates that 6.1% of the polyethylene repeat units are grafted and $^{19}$F NMR shows that more that 90% of the sulfonyl fluoride groups were converted to sulfonimide. DSC analysis of the polymer showed a glass transition temperature at 4° C. and a melting transition at 102° C. with a heat of fusion of 26 J/g.

A film was prepared from the melt by pressing a sample of the polymer in a Pasadena hydraulics model SP 215C press at 140° C. and 30,000 lbs for 5 min. The film was transformed to the lithium salt form by immersing it in a 0.5M LiOH solution in water/methanol (1/1 by volume) at 60° C. for two hours. After rinsing with DI water, it was heated in DI water at 80° C. for an additional two hours and then it was dried in a vacuum oven at 80° C. for 24 hours. The dried hydrolyzed film was soaked in excess propylene carbonate (PC) for several hours and allowed to attain maximum swelling. It was then removed from the liquid, blotted with a paper towel to remove excess solvent, and tested for ionic conductivity. The film absorbed 326% of its weight in PC and had a conductivity of $7.59 \times 10^{-4}$ S/cm.

Examples 32

Synthesis of PSEPVE-imide Grafted Polyethylene in Two Steps

A 500 mL 3-neck round bottom flask, equipped with a condenser, magnetic stirring, addition funnel, gas inlet. and under nitrogen atmosphere was charged with 10.0 grams of polyethylene (Novapolµ® low density polyethylene from NOVA Chemicals of Calgary, AB, Canada) and 250 mL of chlorobenzene (Aldrich). The flask was placed in an oil bath at 126° C. and the mixture stirred until the polyethylene dissolved. After the polymer dissolved 40 grams of PSEPVE were added and then a solution of 2 g of t-butyl peroxide in 50 ml, of chlorobenzene was added drop-wise over a period of 60 minutes. The mixture was stirred at 126° C. for 2 additional hours. After the reaction time the mixture was poured into a large excess of methanol. The precipitated polymer was filtered, washed and dried overnight under vacuum at 70° C. 33.9 g of polymer were obtained. The polymer contained 14% of the repeat units grafted with perfluorosulfonyl fluoride monomer as determined by $^1$H NMR. It had average molecular weights Mn=10,200 and Mw=98,500 as determined by Size Exclusion Chromatography in trichlorobenzene at 135° C. DSC analysis of the polymer showed a glass transition temperature at −30° C., and a melting transition at 102° C. with a heat of fusion of 14 J/g.

20.0 grams of the polymer prepared above and 150 mL of anhydrous chlorobenzene (Aldrich) were charged under nitrogen atmosphere into a 250 mL 3-neck round bottom flask, equipped with a condenser, magnetic stirring, addition funnel, and gas inlet. The flask was placed in an oil bath at 80° C., and after the polymer dissolved, 15 ml of triethylamine were added. Then 5 g of trifluoromethanesulfonamide (TCI America, Portland, Oreg.) were added in small portions using a powder addition funnel and the reaction mixture stirred at 80° C. for 24 hrs.

After the set reaction time, the mixture was poured into methanol. The precipitated polymer was filtered, washed and dried overnight under vacuum at 65° C. 20.2 grams of polymer were obtained. $^1$H and $^{19}$F NMR showed that more than 90% conversion of the sulfonyl fluoride to sulfonimide was achieved.

What is claimed is:

1. A process comprising contacting a polymer having a backbone which comprises at least 50% methylene units with a solvent which swells or dissolves said polymer to form a solvent-swollen polymer or polymer solution;

contacting said solvent swollen polymer or polymer solution with a free-radical initiator and a compound of the formula $F_2C=CFR^1R^2SO_2X$ wherein $R^1$ represents a covalent bond or a perfluoroalkenyl radical having 1 to 20 carbon atoms; $R^2$ is a radical of the formula:

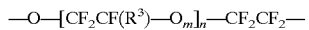

wherein m=0 or 1, n=0, 1, or 2, and $R^3$ is F or a perfluoroalkyl radical having 1–10 carbons; and X is F or a radical represented by the formula

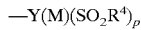

wherein Y is C or N, M is an alkali metal, $R^4$ is a perfluoroalkyl radical having 1–10 carbons optionally substituted with one or more ether oxygens, and p=1 or 2 with the proviso that p=1 when Y is N and p=2 when Y is C;

to form a reaction mixture;

providing sufficient heat to said reaction mixture to cause the initiation of free-radical reaction; and, reacting said mixture to form a graft polymer.

2. The process of claim 1 wherein the polymer further comprises monomer units selected from the group consisting of olefins, acrylates, vinyl acetates, styrenes, and fluorinated mixtures thereof, but not perfluorinated derivatives thereof and mixtures thereof.

3. The process of claim 2 wherein the polymer is selected from the group consisting of polyethylene, polypropylene, ethylene acrylic acid copolymers, ethylene vinyl acetate copolymers, ethylene styrene copolymers, terpolymers thereof with olefins having 3 or more carbons, and combinations thereof.

4. The process of claim 1 wherein the polymer is polyethylene.

5. The process of claim 1 wherein the solvent is selected from the group consisting of chlorobenzene, dichlorobenzene, halogenated hydrocarbons, dimethyl acetamide and dimethyl formamide.

6. The process of claim 5 wherein the solvent is chlorobenzene.

7. The process of claim 1 conducted in a polymer solution.

8. The process of claim 7 conducted in a solution of 3% to 6% by weight of polyethylene in a chlorobenzene solution.

9. The process of claim 1 wherein $R^1$ is a covalent bond or —$CF_2$—.

10. The process of claim 1 wherein m=1, n=0 or 1, and $R^3$ is —$CF_3$.

11. The process of claim 1 wherein X is F.

12. A non-crosslinked polymer comprising a polymer having a backbone which comprises at least 50 mol-% methylene units, and a pendant group comprising a radical represented by the formula

wherein $R^1$ represents a covalent bond or a perfluoroalkenyl radical having 1 to 20 carbon atoms; $R^2$ is a radical of the formula:

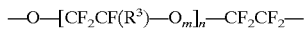

wherein m=0 or 1, n=0, 1, or 2, and $R^3$ is F or a perfluoroalkyl radical having 1–10 carbons, and X is F, —OM, or a radical represented by the formula

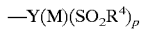

wherein Y is C or N, M is hydrogen or an alkali metal, $R^4$ is a perfluoroalkyl radical having 1–10 carbons optionally substituted by one or more ether oxygens, and p=1 or 2 with the proviso that p=1 when Y is N and p=2 when Y is C.

13. The polymer of claim 12 further comprising up to 50 mol-% of monomer units selected from the group consisting of olefins, acrylates, vinyl acetates, styrenes, and combinations thereof.

14. The polymer of claim 12 having 100 mol-% of methylene units.

15. The polymer of claim 12 wherein $R^1$ is a covalent bond or —$CF_2$—.

16. The polymer of claim 12 wherein m=1, n=0 or 1, and $R^3$ is —$CF_3$.

17. The polymer of claim 12 wherein X is F.

18. The polymer of claim 12 wherein X is —OM, or a radical represented by the formula

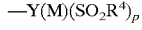

wherein Y is C or N, M is hydrogen or an alkali metal, $R^4$ is a perfluoroalkyl radical having 1–10 carbons optionally substituted by one or more ether oxygens, and p=1 or 2 with the proviso that p=1 when Y is N and p=2 when Y is C.

19. The polymer of claim 18 wherein X is —OM where M is hydrogen or an alkali metal.

20. The polymer of claim 18 wherein X is a radical represented by the formula

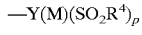

wherein Y is C or N, M is hydrogen or an alkali metal, $R^4$ is a perfluoroalkyl radical having 1–10 carbons optionally substituted by one or more ether oxygens, and p=1 or 2 with the proviso that p=1 when Y is N and p=2 when Y is C.

21. The polymer of claim 20 wherein Y is N, p=1, and $R^4$ is a perfluoroalkyl radical having 1–4 carbons.

22. The polymer of claim 21 wherein Y is C, p=2, and $R^4$ is a perfluoroalkyl radical having 1–4 carbons.

23. The polymer of claim 18 wherein M is Li.

24. The polymer of claim 20 wherein M is Li.

25. An ioniclaly conductive compositions comprising the polymer of claim 12 and an organic carbonate.

26. The ioniclaly conductive composition of claim 25 wherein the organic carbonate is a mixture of ethylene carbonate and dimethyl carbonate.

* * * * *